United States Patent
Lee et al.

(10) Patent No.: US 10,080,128 B2
(45) Date of Patent: Sep. 18, 2018

(54) METHOD AND APPARATUS FOR CONFIGURING D2D DISCOVERY SPECIFIC LOGICAL CHANNEL GROUP IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/325,385

(22) PCT Filed: Aug. 10, 2015

(86) PCT No.: PCT/KR2015/008323
§ 371 (c)(1),
(2) Date: Jan. 10, 2017

(87) PCT Pub. No.: WO2016/022001
PCT Pub. Date: Feb. 11, 2016

(65) Prior Publication Data
US 2017/0188221 A1    Jun. 29, 2017

Related U.S. Application Data

(60) Provisional application No. 62/034,801, filed on Aug. 8, 2014.

(51) Int. Cl.
*H04W 4/00* (2018.01)
*H04W 8/00* (2009.01)
*H04W 92/18* (2009.01)

(52) U.S. Cl.
CPC ............ *H04W 8/005* (2013.01); *H04W 92/18* (2013.01)

(58) Field of Classification Search
CPC .............................. H04W 8/005; H04W 92/18
(Continued)

(56) References Cited

U.S. PATENT DOCUMENTS

2014/0211702 A1*  7/2014  Turtinen .............  H04W 76/023
                                                                370/329
2015/0163689 A1*  6/2015  Lee .....................  H04W 76/023
                                                                370/328
(Continued)

FOREIGN PATENT DOCUMENTS

CN        103686676       3/2014
WO        2013119094      8/2013
(Continued)

OTHER PUBLICATIONS

3GPP—RP-1400648, Jun. 2014, Status report for WI LTE Device to Device Proximity Services.*
(Continued)

*Primary Examiner* — William Nealon
(74) *Attorney, Agent, or Firm* — Lee, Hong, Degerman, Kang & Waimey

(57) ABSTRACT

A method and apparatus for configuring a device-to-device (D2D) discovery specific logical channel group (LCG) in a wireless communication system is provided. A user equipment (UE) calculates a buffer status for D2D discovery announcement, configures a specific LCG identifier (ID) to transmit the D2D discovery announcement, constructs a proximity based services (ProSe) buffer status report (BSR) based on the calculated buffer status and the configured LCG ID, and transmits the constructed ProSe BSR to an evolved NodeB (eNB).

18 Claims, 9 Drawing Sheets

(58) Field of Classification Search
USPC .......................................................... 455/434
See application file for complete search history.

(56) References Cited

U.S. PATENT DOCUMENTS

| | | | | |
|---|---|---|---|---|
| 2016/0044653 A1* | 2/2016 | Bagheri | ............ | H04W 72/0413 |
| | | | | 370/329 |
| 2016/0183276 A1* | 6/2016 | Marinier | ............... | H04W 72/02 |
| | | | | 370/329 |

FOREIGN PATENT DOCUMENTS

| | | |
|---|---|---|
| WO | 2013191353 | 12/2013 |
| WO | 2013191609 | 12/2013 |

OTHER PUBLICATIONS

PCT International Application No. PCT/KR2015/008323, International Search Report dated Nov. 24, 2015, 2 pages.
Qualcomm Incorporated, "Status Report to TSG," 3GPP TSG-RAN Meeting #64, RP-140648, Jun. 4, 2014, 27 pages.
3rd Generation Partnership Project (3GPP), "Technical Specification Group Services and System Aspects; Study on architecture enhancements to support Proximity-based Services (PRoSe) (Release 12)," 3GPP TR 23.703 V1.0.0, Dec. 2013, 275 pages.
3rd Generation Partnership Project (3GPP), "Technical Specification Group Radio Access Network; Evolved Universal Terrestrial Radio Access (E-UTRA); Medium Access Control (MAC) protocol specification (Release 12)," 3GPP TS 36.321 V12.2.0, Section 5.4.5, Jun. 2014, 4 pages.

* cited by examiner

METHOD AND APPARATUS FOR CONFIGURING D2D DISCOVERY SPECIFIC LOGICAL CHANNEL GROUP IN WIRELESS COMMUNICATION SYSTEM

CROSS-REFERENCE TO RELATED APPLICATIONS

This application is the National Stage filing under 35 U.S.C. 371 of International Application No. PCT/KR2015/008323, filed on Aug. 10, 2015, which claims the benefit of U.S. Provisional Application No. 62/034,801, filed on Aug. 8, 2014, the contents of which are all hereby incorporated by reference herein in their entirety.

BACKGROUND OF THE INVENTION

Field of the Invention

The present invention relates to wireless communications, and more particularly, to a method and apparatus for configuring a device-to-device (D2D) discovery specific logical channel group (LCG) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

Resources may be allocated for ProSe. A method for allocating or requesting resources for ProSe efficiently may be required.

SUMMARY OF THE INVENTION

The present invention provides a method and apparatus for configuring a device-to-device (D2D) discovery specific logical channel group (LCG) in a wireless communication system. The present invention provides a method and apparatus for using a proximity-based services (ProSe) buffer status report (BSR) for resource allocation for D2D direct discovery.

In an aspect, a method for configuring, by a user equipment (UE), a device-to-device (D2D) discovery specific logical channel group (LCG) in a wireless communication system is provided. The method includes calculating a buffer status for D2D discovery announcement, configuring a specific LCG identifier (ID) to transmit the D2D discovery announcement, constructing a proximity based services (ProSe) buffer status report (BSR) based on the calculated buffer status and the configured LCG ID, and transmitting the constructed ProSe BSR to an evolved NodeB (eNB).

In another aspect, a user equipment (UE) includes a memory, a transceiver, and a processor coupled to the memory and the transceiver, and configured to calculate a buffer status for device-to-device (D2D) discovery announcement, configure a specific logical channel group (LCG) identifier (ID) to transmit the D2D discovery announcement, construct a proximity based services (ProSe) buffer status report (BSR) based on the calculated buffer status and the configured LCG ID, and control the transceiver to transmit the constructed ProSe BSR to an evolved NodeB (eNB).

A UE can request resource allocation for D2D direct discovery efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
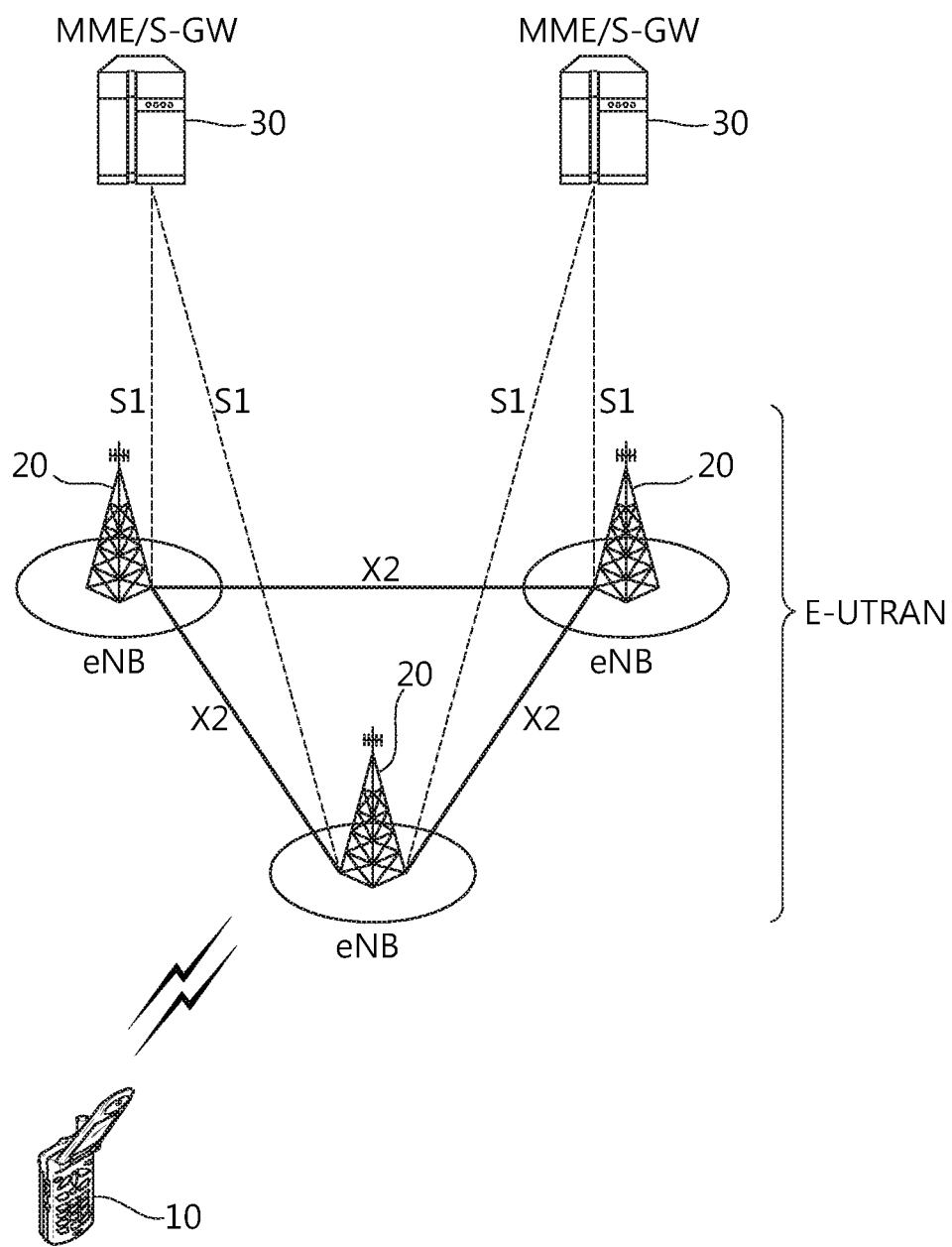
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of

UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
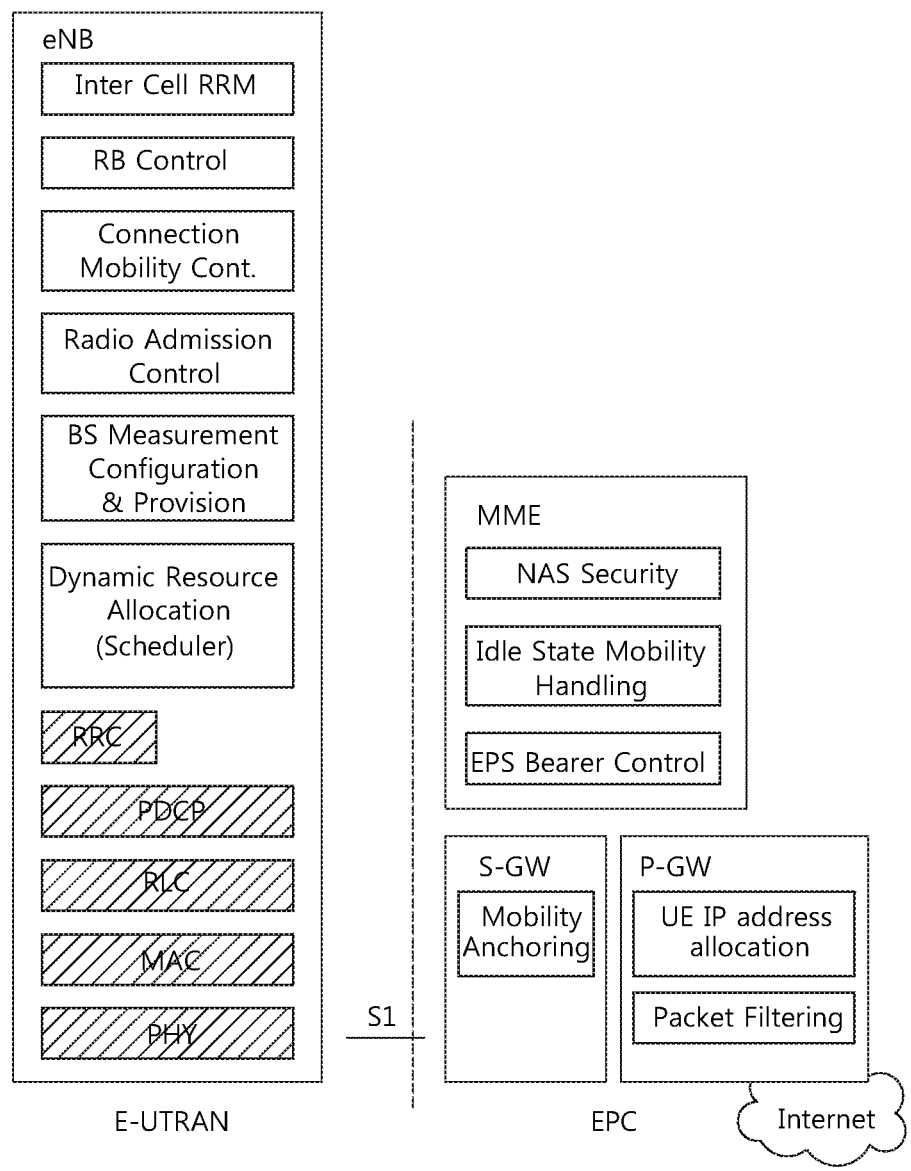
FIG. 2 shows a block diagram of architecture of a typical E-UTRAN and a typical EPC.

FIG. 2 shows a block diagram of architecture of a typical E-UTRAN and a typical

EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
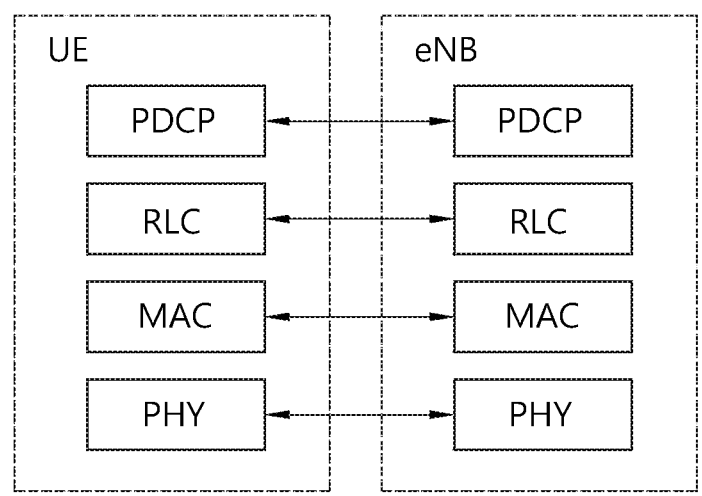
FIG. 3 shows a block diagram of a user plane protocol stack of an LTE system.
Figure 4:
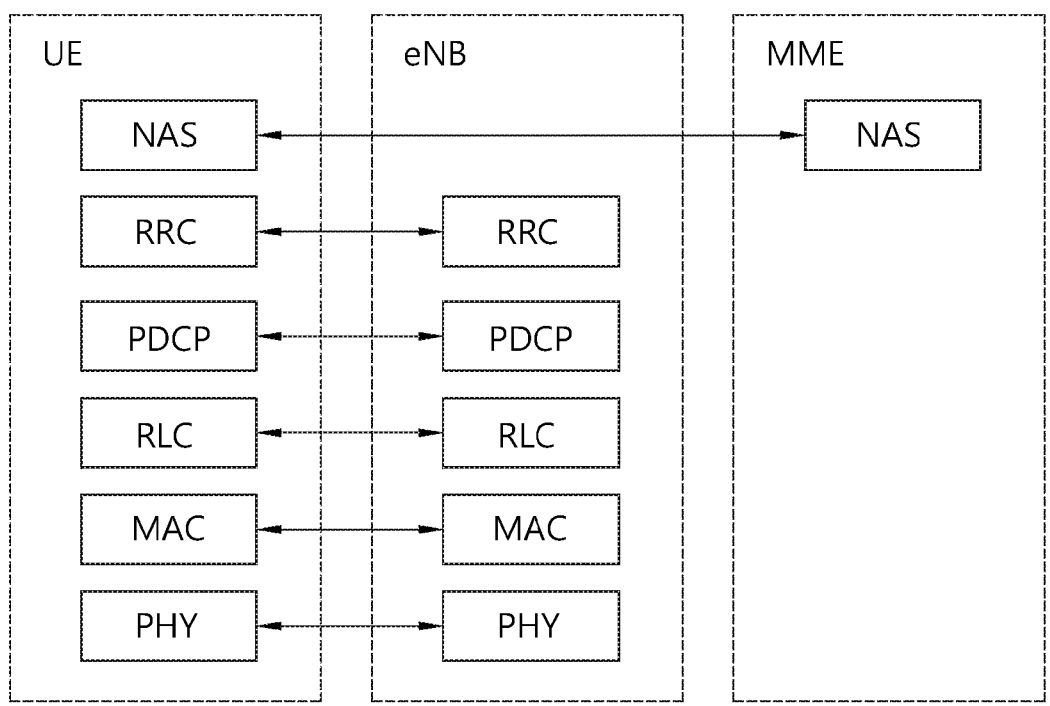
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
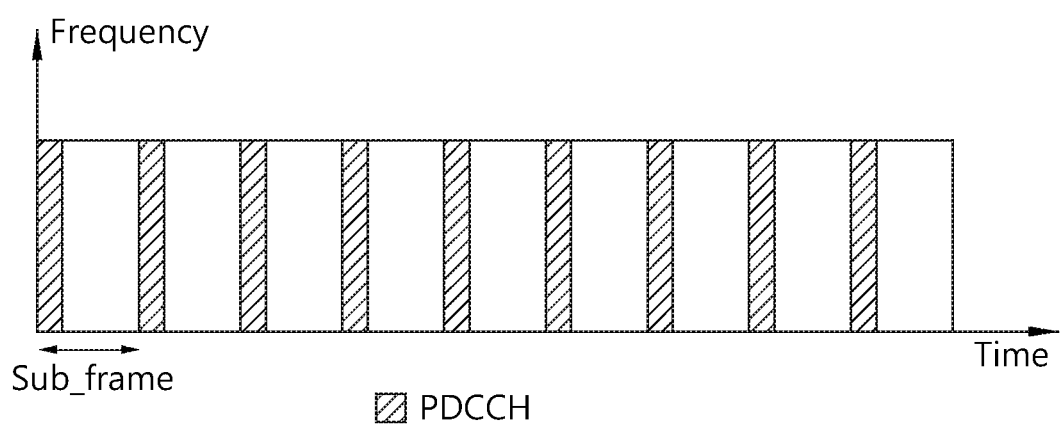
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Buffer status reporting (BSR) is described. It may be referred to Section 5.4.5 of 3GPP TS 36.321 V12.2.0 (2014-06). The BSR procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to a logical channel group (LCG). For the BSR procedure, the UE shall consider all radio bearers which are not suspended and may consider radio bearers which are suspended.

A BSR shall be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "regular BSR";

UL resources are allocated and number of padding bits is equal to or larger than the size of the BSR MAC control element (CE) plus its subheader, in which case the BSR is referred below to as "padding BSR";

retxBSR-Timer expires and the UE has data available for transmission for any of the logical channels which belong to a LCG, in which case the BSR is referred below to as "regular BSR";

periodicBSR-Timer expires, in which case the BSR is referred below to as "periodic BSR".

For regular and periodic BSR, if more than one LCG has data available for transmission in the TTI where the BSR is transmitted, long BSR is reported. Else, short BSR is reported.

For Padding BSR, if the number of padding bits is equal to or larger than the size of the short BSR plus its subheader but smaller than the size of the long BSR plus its subheader, and if more than one LCG has data available for transmission in the TTI where the BSR is transmitted, truncated BSR of the LCG with the highest priority logical channel with data available for transmission is reported. Else report short BSR is reported. Else if the number of padding bits is equal to or larger than the size of the Long BSR plus its subheader, long BSR is reported.

If the BSR procedure determines that at least one BSR has been triggered and not cancelled, and if the UE has UL resources allocated for new transmission for this TTI, the UE instruct the multiplexing and assembly procedure to generate the BSR MAC CE(s), starts or restarts periodicBSR-Timer except when all the generated BSRs are truncated BSRs, and start or restart retxBSR-Timer. Else if a regular BSR has been triggered, and if an UL grant is not configured or the regular BSR was not triggered due to data becoming available for transmission for a logical channel for which logical channel SR masking (logicalChannelSR-Mask) is setup by upper layers, a scheduling request shall be triggered.

A MAC PDU shall contain at most one MAC BSR CE, even when multiple events trigger a BSR by the time a BSR can be transmitted in which case the regular BSR and the periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC CE plus its subheader. All triggered BSRs shall be cancelled when a BSR is included in a MAC PDU for transmission.

The UE shall transmit at most one regular/periodic BSR in a TTI. If the UE is requested to transmit multiple MAC PDUs in a TTI, it may include a padding BSR in any of the MAC PDUs which do not contain a regular/periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

BSR MAC CE consist of either:
Short BSR and truncated BSR format: one LCG ID field and one corresponding buffer size field; or
Long BSR format: four buffer size fields, corresponding to LCG IDs #0 through #3.

The BSR formats are identified by MAC PDU subheaders with LCIDs.

The fields LCG ID and buffer size are defined as follow:
LCG ID: The logical channel group ID field identifies the group of logical channel(s) which buffer status is being reported. The length of the field is 2 bits;
Buffer size: The buffer size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

ProSe direct communication is a mode of communication whereby two public safety UEs can communicate with each other directly over the PC5 interface. This communication mode is supported when the UE is served by E-UTRAN and when the UE is outside of E-UTRA coverage. A transmitter UE transmits scheduling assignment (SA) to indicate the resources it is going to use for data transmission to the receiver UEs.

Figure 6:
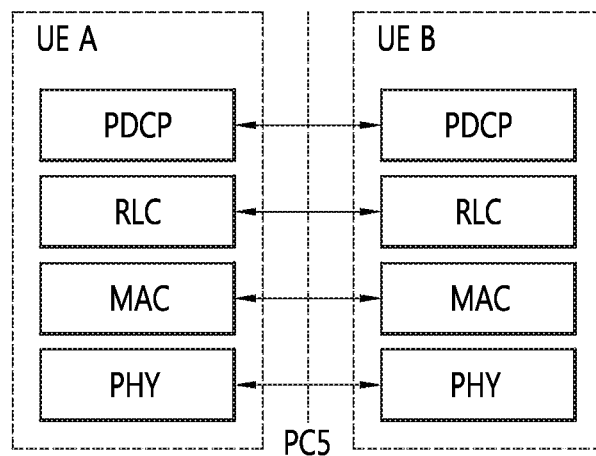
FIG. 6 shows an example of a user plane protocol stack for ProSe direct communication.

FIG. 6 shows an example of a user plane protocol stack for ProSe direct communication. TUE radio protocol architecture for ProSe direct communication is given for the user plane and the control plane. Referring to FIG. 6, PDCP, RLC and MAC sublayers (terminate at the other UE) perform the functions listed for the user plane, e.g. header compression, HARQ retransmissions. The PC5 interface consists of PDCP, RLC, MAC and PHY.

User plane details of ProSe direct communication is described. There may be no HARQ feedback for ProSe direct communication. A UE may establish multiple logical channels. Logical channel identifier (LCID) included within the MAC subheader uniquely identifies a logical channel within the scope of one source layer-2 ID and destination Layer-2 ID combination. All logical channels are mapped to one specified logical channel group (e.g. LCGID 3). At MAC multiplexing/de-multiplexing, priority handling and padding may be useful for ProSe direct communication. RLC unacknowledged mode (UM) may be used for ProSe direct communication. Segmentation and reassembly of RLC service data units (SDUs) may be performed. A receiving UE may need to maintain at least one RLC UM entity per transmitting peer UE. An RLC UM receiver entity may not need to be configured prior to reception of the first RLC UM data unit. U-Mode may be used for header compression in PDCP for ProSe direct communication. For control plane, a UE does not establish and maintain a logical connection to receiving UEs prior to a ProSe direct communication.

For ProSe direct communication, the ProSe-enabled UE can operate in two modes for resource allocation, which include Mode 1 (eNB scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of scheduling assignment(s) and data. The UE sends a scheduling request (dedicated scheduling request (D-SR) or random access) to the eNB followed by a ProSe BSR. Based on the BSR, the eNB can determine that the UE has data for a ProSe direct communication transmission and estimate the resources needed for transmission. In Mode 2, a UE on its own selects resources from resource pools to transmit scheduling assignment and data.

A UE is considered in-coverage if it has a serving cell (i.e. the UE is RRC_CONNECTED or is camping on a cell in RRC IDLE). If the UE is out of coverage, it can only use mode 2. If the UE is in coverage, it may use mode 1 if the eNB configures it accordingly. If the UE is in coverage, it may use mode 2 if the eNB configures it accordingly. When there are no exceptional conditions, the UE changes from Mode 1 to Mode 2 or Mode 2 to Mode 1 only if it is configured by eNB to do so. If the UE is in coverage, it shall use only the mode indicated by eNB configuration unless one of the exceptional cases occurs. The UE considers itself to be in exceptional conditions while T311 or T301 is running. When an exceptional case occurs, the UE is allowed to use Mode 2 temporarily even though it was configured to use Mode 1.

While being in the coverage area of an E-UTRA cell, the UE shall perform ProSe direct communication transmission on the UL carrier only on the resources assigned by that cell, even if resources of that carrier have been pre-configured, e.g. in universal integrated circuit card (UICC).

For UEs in RRC_IDLE, the eNB may select one of the following options. One is that the eNB may provide a Mode 2 transmission resource pool in system information block (SIB). UEs that are authorized for ProSe direct communication use these resources for ProSe direct communication in RRC_IDLE. The other one is that the eNB may indicate in SIB that it supports ProSe direct communication but does not provide resources for it. UEs need to enter RRC_CONNECTED to perform ProSe direct communication transmission.

For UEs in RRC CONNECTED, a UE in RRC CONNECTED that is authorized to perform ProSe direct communication transmission indicates to the eNB that it wants to perform ProSe direct communication transmissions. The eNB validates whether the UE in RRC CONNECTED is authorized for ProSe direct communication transmission using the UE context received from MME. The eNB may configure a UE in RRC_CONNECTED by dedicated signalling with a Mode 2 resource allocation transmission resource pool that may be used without constraints while the UE is RRC_CONNECTED. Alternatively, the eNB may configure a UE in RRC_CONNECTED by dedicated signalling with a Mode 2 resource allocation transmission resource pool which the UE is allowed to use only in exceptional cases and rely on Mode 1 otherwise.

The resource pool for scheduling assignment when the UE is out of coverage can be pre-configured for reception and transmission. The resource pool for scheduling assignment when the UE is in coverage can be configured as follows. The resource pool used for reception is configured by the eNB via RRC, in dedicated or broadcast signaling. The resource pool used for transmission is configured by the eNB via RRC if Mode 2 resource allocation is used. The resource pool for scheduling assignment used for transmission is not known to the UE if Mode 1 resource allocation is used. The eNB schedules the specific resource(s) to use for scheduling assignment transmission if Mode 1 resource allocation is used. The specific resource assigned by the eNB is within the resource pool for reception of scheduling assignment that is provided to the UE.

In order to perform communication even when some UEs are in-coverage and some UEs are out of coverage, all UEs (i.e. both in and out of coverage) should monitor resource pool for scheduling assignment which is the union of the resource pools used for transmission of scheduling assignment in all (or some of the when in-coverage) cells and transmission of scheduling assignment out of coverage.

ProSe direct discovery is defined as the procedure used by the ProSe-enabled UE to discover other ProSe-enabled UE(s) in its proximity using E-UTRA direct radio signals via PC5. ProSe direct discovery is supported only when the UE is served by E-UTRAN.

Figure 7:
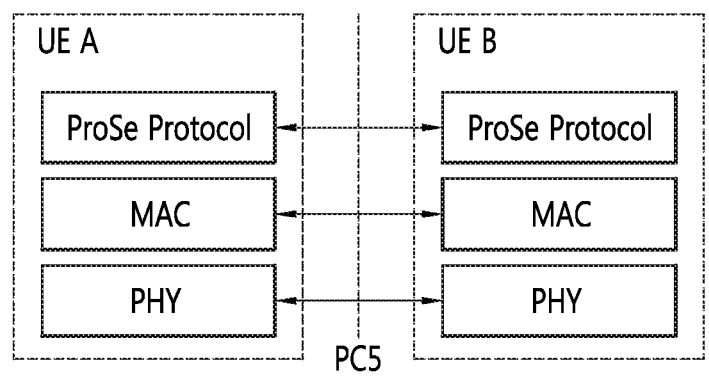
FIG. 7 shows an example of a user plane protocol stack for ProSe direct communication.

FIG. 7 shows an example of a user plane protocol stack for ProSe direct communication. Referring to FIG. 7, UE A and UE B perform ProSe direct communication using ProSe protocol via PC5. Upper layer handles authorization for announcement and monitoring of discovery information. Content of discovery information is transparent to AS and no distinction in AS is made for ProSe direct discovery models and types of ProSe direct discovery. The ProSe protocol ensures that it delivers only valid discovery information to AS for announcement. The UE can participate in announcing and monitoring of discovery information in both RRC_IDLE and RRC_CONNECTED state as per eNB configuration. The UE announces and monitors its discovery information subject to the half-duplex constraint. Announcing and monitoring UE maintains the current coordinated universal time (UTC) time. Announcing UE transmits the discovery message which is generated by the ProSe protocol taking into account the UTC time upon transmission of the discovery message. In the monitoring UE, the ProSe protocol provides the message to be verified together with the UTC time upon reception of the message to the ProSe function.

AS for ProSe direct discovery consists of only MAC and PHY. The AS layer performs interfaces with upper layer (ProSe Protocol). The MAC layer receives the discovery information from the upper layer (ProSe Protocol). The IP layer is not used for transmitting the discovery information. The AS layer also performs scheduling. The MAC layer determines the radio resource to be used for announcing the discovery information received from upper layer. The AS layer also performs discovery PDU generation. The MAC layer builds the MAC PDU carrying the discovery information and sends the MAC PDU to the physical layer for transmission in the determined radio resource. No MAC header is added.

There are two types of resource allocation for discovery information announcement, which include Type 1 and Type 2. Type 1 resource allocation is a resource allocation procedure where resources for announcing of discovery information are allocated on a non UE specific basis. In type 1, the eNB provides the UE(s) with the resource pool configuration used for announcing of discovery information. The configuration may be signaled in SIB. The UE autonomously selects radio resource(s) from the indicated resource pool and announce discovery information. The UE can announce discovery information on a randomly selected discovery resource during each discovery period. Type 2 resource allocation is a resource allocation procedure where resources for announcing of discovery information are allocated on a UE specific basis. In Type 2, the UE in RRC_CONNECTED may request resource(s) for announcing of discovery information from the eNB via RRC. The eNB assigns resource(s) via RRC. The resources are allocated within the resource pool that is configured in UEs for monitoring.

For UEs in RRC_IDLE, the eNB may select one of the following options. One is that the eNB may provide a Type 1 resource pool for discovery information announcement in SIB. UEs that are authorized for Prose direct discovery use these resources for announcing discovery information in RRC_IDLE. The other one is that the eNB may indicate in SIB that it supports ProSe direct discovery but does not provide resources for discovery information announcement. UEs need to enter RRC_CONNECTED in order to request resources for discovery information announcement.

For UEs in RRC_CONNECTED, a UE authorized to perform ProSe direct discovery announcement, when it needs to perform ProSe direct discovery announcement, indicates to the eNB that it wants to perform ProSe direct discovery announcement. The eNB validates whether the UE is authorized for ProSe direct discovery announcement using the UE context received from MME. The eNB may configure the UE to use a Type 1 resource pool or dedicated Type 2 resources for discovery information announcement via dedicated RRC signaling (or no resource). The resources allocated by the eNB are valid until a) the eNB de-configures the resource(s) by RRC signaling or b) the UE enters RRC_IDLE.

Receiving UEs in RRC_IDLE and RRC_CONNECTED monitor both Type 1 and Type 2 discovery resource pools as authorised. The eNB provides the resource pool configuration used for discovery information monitoring in SIB. The SIB may contain discovery resources used for announcing in neighbor cells as well.

Synchronous and asynchronous deployments are supported. Discovery resources can be overlapping or non-overlapping across cells. The serving cell may provide in SIB information which neighbour frequencies support ProSe direct discovery. For synchronized, full-overlapping, intra-frequency deployment, the eNB provides just one resource pool (no D2D synchronization signal (D2DSS) information required).

According to the prior described above, the UE may request resource for D2D direct discovery by using an RRC message. However, since the UE may frequently request resource for D2D direct discovery, it is not efficient to use RRC message for resource allocation for D2D direct discovery.

In order to solve the problem described above, a method for performing D2D direct discovery in a UE according to an embodiment of the present invention is described below. According to an embodiment of the present invention, the D2D direct discovery specific LCG may be configured. Accordingly, D2D discovery announcement (e.g. D2D discovery message) may be transmitted via a shared channel, as well as dedicated channel.

Figure 8:
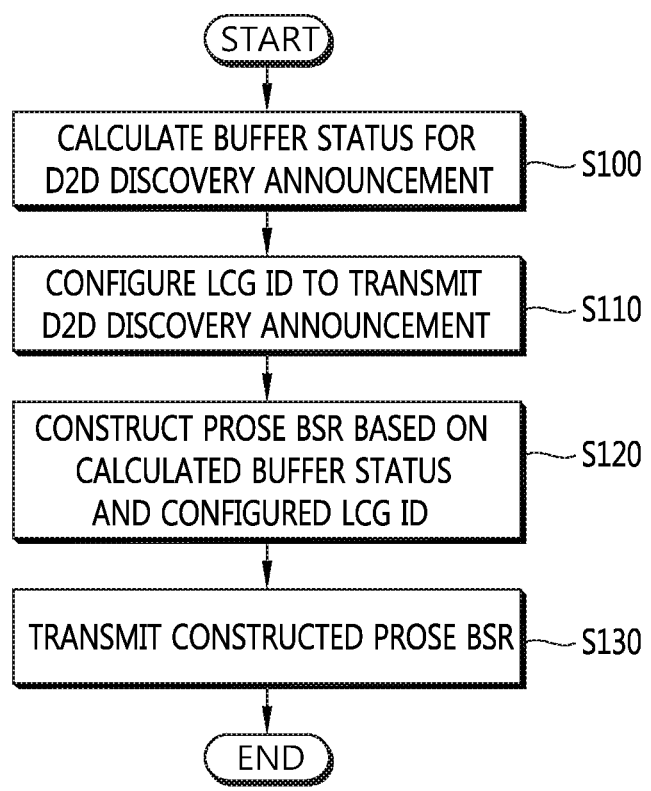
FIG. 8 shows an example of a method for configuring a D2D discovery specific logical channel group according to an embodiment of the present invention.

FIG. 8 shows an example of a method for configuring a D2D discovery specific logical channel group according to an embodiment of the present invention.

In step S100, the UE calculates buffer status for D2D discovery announcement (e.g. D2D discovery message). The UE may calculate buffer status for D2D discovery announcement by receiving information from upper layer. More specifically, the ProSe protocol of the UE may indicate to the MAC layer of the UE that there is available D2D discovery information for D2D discovery announcement. The ProSe protocol of the UE may inform the MAC layer of the UE about total size of available D2D discovery information consisting of one or more D2D discovery messages, the number of available D2D discovery messages, or size of each available D2D discovery message. Alternatively, the ProSe protocol of the UE may also inform the MAC layer of the UE about the number of LCG ID. The number of LCG ID may be differently configured depending on a type of D2D discovery application/announcement/message. The number of LCG ID may be included in the ProSe BSR described below. The MAC layer of the UE may calculate buffer status for D2D discovery announcement based on the total size of available D2D discovery information consisting of one or D2D more discovery messages, the number of available D2D discovery messages, or size of each available D2D discovery message.

In step S110, the UE configures a specific LCG ID to transmit D2D discovery announcement. Further, the UE may configure a specific value of a group index to transmit D2D discovery announcement. The UE may receive configuration of D2D discovery from the network, e.g. via system information or dedicated signaling. The configuration may indicate the specific number of LCG ID or the specific value of group index for D2D discovery announcement. The configuration may be received from eNB (i.e. master eNB (MeNB) or secondary eNB (SeNB)), MME or a server in the network. LCG ID or group index for D2D discovery may be fixed to a specific number. D2D discovery and D2D communication may use different numbers of LCG ID or group index. Or, D2D discovery and D2D communication may use the same number of LCG ID or group index.

In step S120, the UE constructs a ProSe BSR based on the calculated buffer status and the configured LCG ID. More specifically, if ProSe BSR is triggered, the UE may transmit D-SR or perform random access. If the UE receives UL grant from the eNB, the MAC layer of the UE may construct the ProSe BSR including the calculated buffer status and the configured number of LCG ID for D2D discovery.

In step S130, the UE transmits the constructed ProSe BSR to the eNB. The eNB may be one of the MeNB or SeNB. The eNB may assign resources to the UE for D2D discovery. The UE may transmit the D2D discovery information to the eNB by using the assigned resources.

Figure 9:
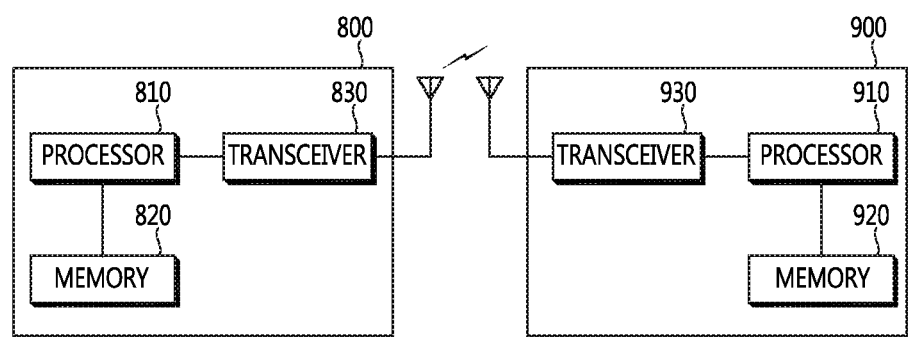
FIG. 9 shows a wireless communication system to implement an embodiment of the present invention.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a user equipment (UE) configuring a device-to-device (D2D) discovery specific logical channel group (LCG) in a wireless communication system, the method comprising:
   receiving a configuration from a network indicating a specific LCG identifier (ID) for a D2D discovery announcement;
   calculating a buffer status for the D2D discovery announcement;
   configuring the specific LCG ID to transmit the D2D discovery announcement;
   constructing a proximity based services (ProSe) buffer status report (BSR) for the D2D discovery announcement, the ProSe BSR including the calculated buffer status and the specific LCG ID configured to transmit the D2D discovery announcement; and
   transmitting the constructed ProSe BSR to an evolved NodeB (eNB).

2. The method of claim 1, wherein the configuration further indicates a specific value of a group index for the D2D discovery announcement.

3. The method of claim 1, wherein the configuration is received via system information or dedicated signaling.

4. The method of claim 1, wherein the configuration is received from the eNB, a mobility management entity, or a server in the network.

5. The method of claim 1, wherein the specific LCG ID is fixed for the D2D discovery announcement.

6. The method of claim 1, wherein the specific LCG ID is differently configured depending on a type of the D2D discovery announcement.

7. The method of claim 1, wherein calculating the buffer status comprises a ProSe protocol of the UE informing a media access control layer of the UE about the specific LCG ID.

8. The method of claim 1, wherein the D2D discovery announcement includes a D2D discovery message.

9. The method of claim 1, wherein the eNB is a master eNB or a secondary eNB.

10. A user equipment (UE) for configuring a device-to-device (D2D) discovery specific logical channel group (LCG) in a wireless communication system, the UE comprising:
    a memory configured to store information;
    a transceiver configured to transmit and receive information; and
    a processor coupled to the memory and the transceiver, the processor configured to:
    receive a configuration from a network indicating a specific LCG identifier (ID) for a D2D discovery announcement;
    calculate a buffer status for the D2D discovery announcement;
    configure the specific LCG ID to transmit the D2D discovery announcement;
    construct a proximity based services (ProSe) buffer status report (BSR) for the D2D discovery announcement, the ProSe BSR including the calculated buffer status and the specific LCG ID configured to transmit the D2D discovery announcement and
    control the transceiver to transmit the constructed ProSe BSR to an evolved NodeB (eNB).

11. The UE of claim 10, wherein the configuration further indicates a specific value of a group index for the D2D discovery announcement.

12. The UE of claim 10, wherein the configuration is received via system information or dedicated signaling.

13. The UE of claim 10, wherein the configuration is received from the eNB, a mobility management entity, or a server in the network.

14. The UE of claim 10, wherein the specific LCG ID is fixed for the D2D discovery announcement.

15. The UE of claim 10, wherein the specific LCG ID is differently configured depending on a type of the D2D discovery announcement.

16. The UE of claim 10, wherein calculating the buffer status for D2D discovery announcement comprises a ProSe protocol of the UE informing a media access control layer of the UE about the specific LCG ID.

17. The UE of claim 10, wherein the D2D discovery announcement includes a D2D discovery message.

18. The UE of claim 10, wherein the eNB is a master eNB or a secondary eNB.

* * * * *